(12) United States Patent
Sood (10) Patent No.: US 9,223,392 B2
(45) Date of Patent: Dec. 29, 2015

(54) REDUCED POWER STATE NETWORK PROCESSING

(71) Applicant: Kapil Sood, Beaverton, OR (US)

(72) Inventor: Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/953,160

(22) Filed: Jul. 29, 2013

(65) Prior Publication Data

US 2013/0311809 A1    Nov. 21, 2013

Related U.S. Application Data

(63) Continuation of application No. 12/346,125, filed on Dec. 30, 2008, now Pat. No. 8,498,229.

(51) Int. Cl.
*G06F 1/32* (2006.01)
*H04L 12/10* (2006.01)
*H04L 12/861* (2013.01)

(52) U.S. Cl.
CPC ............ *G06F 1/3293* (2013.01); *G06F 1/3209* (2013.01); *G06F 1/3287* (2013.01); *H04L 12/10* (2013.01); *H04L 49/90* (2013.01); *Y02B 60/1282* (2013.01); *Y02B 60/32* (2013.01)

(58) Field of Classification Search
None
See application file for complete search history.

(56) References Cited

U.S. PATENT DOCUMENTS

| | | | |
|---|---|---|---|
| 6,631,469 B1 | 10/2003 | Silvester | |
| 6,662,234 B2 | 12/2003 | Cheng | |
| 7,463,607 B2 | 12/2008 | Sood et al. | |
| 7,716,730 B1 | 5/2010 | Droux et al. | |
| 8,498,229 B2 | 7/2013 | Sood | |
| 2004/0128310 A1 | 7/2004 | Zmudzinski et al. | |
| 2004/0218555 A1 | 11/2004 | Chen et al. | |
| 2004/0225907 A1 | 11/2004 | Jain et al. | |
| 2005/0044430 A1 | 2/2005 | Cheshire | |
| 2006/0083201 A1 | 4/2006 | He et al. | |
| 2006/0168378 A1 | 7/2006 | Muth | |
| 2006/0218398 A1 | 9/2006 | Sood et al. | |
| 2006/0262932 A1 | 11/2006 | Sood et al. | |

(Continued)

FOREIGN PATENT DOCUMENTS

| CN | 1415085 A | 4/2003 |
|---|---|---|
| CN | 1512728 A | 7/2004 |

(Continued)

OTHER PUBLICATIONS

Office Action received for Chinese Patent Application No. 200910261942.4, mailed on Jul. 29, 2013, 10 pages of Office Action including 6 pages of unofficial English translation.

(Continued)

*Primary Examiner* — Diane Lo
(74) *Attorney, Agent, or Firm* — Barnes & Thornburg LLP (57) ABSTRACT

Technologies for reduced power network processing include a main processor, a low-power co-processor, and a network interface controller. The network interface controller receives one or more network packets while the computing device is in a sleep state, filters the one or more network packets to identify network packets to be handled by the low-power co-processor without waking the main processor from the sleep state, and wakes the low-power co-processor, without waking the main processor, to handle at least one network packet of the identified network packets to be handled by the low-power co-processor.

19 Claims, 4 Drawing Sheets

(56) References Cited

U.S. PATENT DOCUMENTS

| | | | |
|---|---|---|---|
| 2007/0008903 A1 | 1/2007 | Sood et al. | |
| 2007/0079151 A1 | 4/2007 | Connor | |
| 2007/0130457 A1 | 6/2007 | Kamat et al. | |
| 2008/0034240 A1 | 2/2008 | Park | |
| 2008/0072047 A1 | 3/2008 | Sarikaya et al. | |
| 2008/0162682 A1 | 7/2008 | Ramachandran et al. | |
| 2008/0219196 A1 | 9/2008 | Ptasinski | |
| 2008/0232290 A1* | 9/2008 | Elzur et al. | 370/311 |
| 2008/0233962 A1 | 9/2008 | Hazra et al. | |
| 2009/0135751 A1 | 5/2009 | Hodges et al. | |
| 2010/0023788 A1* | 1/2010 | Scott et al. | 713/320 |
| 2010/0070642 A1 | 3/2010 | Bansal et al. | |
| 2010/0165897 A1 | 7/2010 | Sood | |

FOREIGN PATENT DOCUMENTS

| | | |
|---|---|---|
| CN | 1784918 A | 6/2006 |
| CN | 1823495 A | 8/2006 |
| EP | 944232 A2 | 9/1999 |
| JP | 11331302 A | 11/1999 |
| JP | 2005242431 A | 9/2005 |
| JP | 2008181436 A | 8/2008 |

OTHER PUBLICATIONS

"Advanced Configuration and Power Interface", Wikipedia, the free encyclopedia, Dec. 21, 2008, 4 pages.
Phifer, Lisa, "WPA PSK Crackers: Loose Lips Sink Ships", Wi-Fi Planet, Mar. 23, 2007, 6 pages.
"Wi-Fi Protected Access", Wikipedia, the free encyclopedia, Dec. 11, 2008, 4 pages.
"Internet Layer", Wikipedia, the free encyclopedia, Nov. 9, 2008, 3 pages.
"Transport Layer", Wikipedia, the free encyclopedia, Dec. 21, 2008, 4 pages.
"Link Layer", Wikipedia, the free encyclopedia, Dec. 22, 2008, 2 pages.
"Wake-on-LAN", Wikipedia, the free encyclopedia, Dec. 22, 2008, 3 pages.
"TCP Offload Engine", Wikipedia, the free encyclopedia, Dec. 11, 2008, 4 pages.
"Internet Protocol Suite", Wikipedia, the free encyclopedia, Dec. 15, 2008, 6 pages.
"IEEE 802.11r-2008", Wikipedia, the free encyclopedia, Nov. 6, 2008, 3 pages.
"Transport Layer Security", Wikipedia, the free encyclopedia, Dec. 19, 2008, 12 pages.
"Transmission Control Protocol", Wikipedia, the free encyclopedia, Dec. 23, 2008, 18 pages.
"Intel Centrino Mobile Technology Wake on Wireless LAN (WoWLAN) Feature Technical Brief", Intel, 2006, 6 pages.
"Application Layer", Wikipedia, the free encyclopedia, Nov. 8, 2008, 2 pages.
"OSI Model", Wikipedia, the free encyclopedia, Dec. 22, 2008, 7 pages.
Office Action received in Japanese Patent Application No. 2009-289856, mailed Mar. 6, 2012, 4 pages of Office Action, including 2 pages of English translation.
Office Action received in China Patent Application No. 2009-10261942.4, mailed Jul. 30, 2012, 10 pages of Office Action, including 5 pages of English translation.
Office Action received in Korean Patent Application No. 2009-0131016, mailed Apr. 29, 2011.
Office Action received in Korean Patent Application No. 2009-0131016, mailed Nov. 22, 2011.
Notice of Allowance received in Korean Patent Application No. 2009-0131016, issued Jul. 30, 2012, 3 pages of Notice of Allowance, including 1 page of English translation.
Japanese Office Action received for Japanese Patent Application No. 2009-289856, mailed Aug. 28, 2012, 2 pages of Japanese Office Action and 2 pages of unofficial English summary translation.
Office Action received in European Patent Application No. 09 252 884.3, mailed Jan. 30, 2013, 4 pages.
European Search Report received for European Patent Application No. 09252884.3, mailed Oct. 8, 2012, 3 pages.
Decision for Grant received in Japanese Patent Application No. 2009-289856, mailed Dec. 4, 2012, 1 page of Japanese Decision for Grant and 1 page of partial, unofficial English translation.
Office Action received for Chinese Patent Application No. 200910261942.4, mailed on Mar. 1, 2013, 3 pages of Chinese Office Action and 3 pages of unofficial English translation.
Notice of Granting Patent Right for Invention received for Chinese Patent Application No. 200910261942.4, mailed May 6, 2014, 8 pages of Notice including 4 pages of unofficial English translation.
Office Action received for Chinese Patent Application No. 200910261942.4, mailed on Dec. 4, 2013, 11 pages of Office Action including 6 pages of unofficial English translation.

\* cited by examiner

REDUCED POWER STATE NETWORK PROCESSING

CROSS-REFERENCE TO RELATED APPLICATION

This application is a continuation application of U.S. application Ser. No. 12/346,125, entitled "Reduced Power State Network Processing," which was filed on Dec. 30, 2008.

BACKGROUND

Computing devices such as laptops, netbooks, desktops and servers support one or more low power and/or power saving states. One highly supported power saving standard is defined by the *Advanced Configuration and Power Interface (ACPI) Specification*, Revision 3.0b, Oct. 10, 1106. In particular, the ACPI Specification defines system power states G0-G3, device power states D0-D1, and processor states C0-C3. The system power state G0 refers to a fully powered system state, the device power state D0 refers to a fully powered device state, and the processor power states C0 refers to a fully-powered operating state. The other power states refer to off states or various levels of reduced power states in which portions of the system, device, and/or processor may be halted or turned-off in order to reduce power consumed by the system, device and/or processor. To take advantage of such lower power states, computing devices may detect periods of system, device, and/or processor inactivity and place such inactive or idle components in a lower power state to conserve energy.

Due to network protocol implementations, the processor of the computing device processes incoming requests from a network. In particular, the processor is involved in the processing of incoming networking packets such as Internet Protocol (IP) packets, Transport Control Protocol (TCP) packets, Transport Layer Security (TLS) protocol packets, Address Resolution Protocol (ARP) packets, Dynamic Host Configuration Protocol (DHCP) packets, Universal Plug and Play (UPnP) protocol packets, application keep alive packets, as well as others. As such, network packets received during periods in which the computing device is otherwise idle may result in waking the system and processor from a low power state in order to process the incoming network packets. If the processor of a computing device is interrupted incessantly during idle periods to process incoming network packets, then the processor and the computing device may remain in a full power state despite being "idle" and otherwise suitable for entering or remaining in a low power state. Such packet processing consumes power on laptops, desktops, servers and/or other wall-powered computing devices, and reduces battery life on laptops, netbooks, and other battery powered computing devices.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. Furthermore, some reference labels may include a superscript and/or subscript to identify a particular item of a group of corresponding or analogous items; but such superscripts and/or subscripts may be omitted in the following description when referring to the group of items or a non-specific item of the group.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing information in a form readable by a machine (e.g., a computing device). For example, a machine-readable medium may include read only memory (ROM); random access memory (RAM); magnetic disk storage media; optical storage media; flash memory devices; and others.

Figure 1:
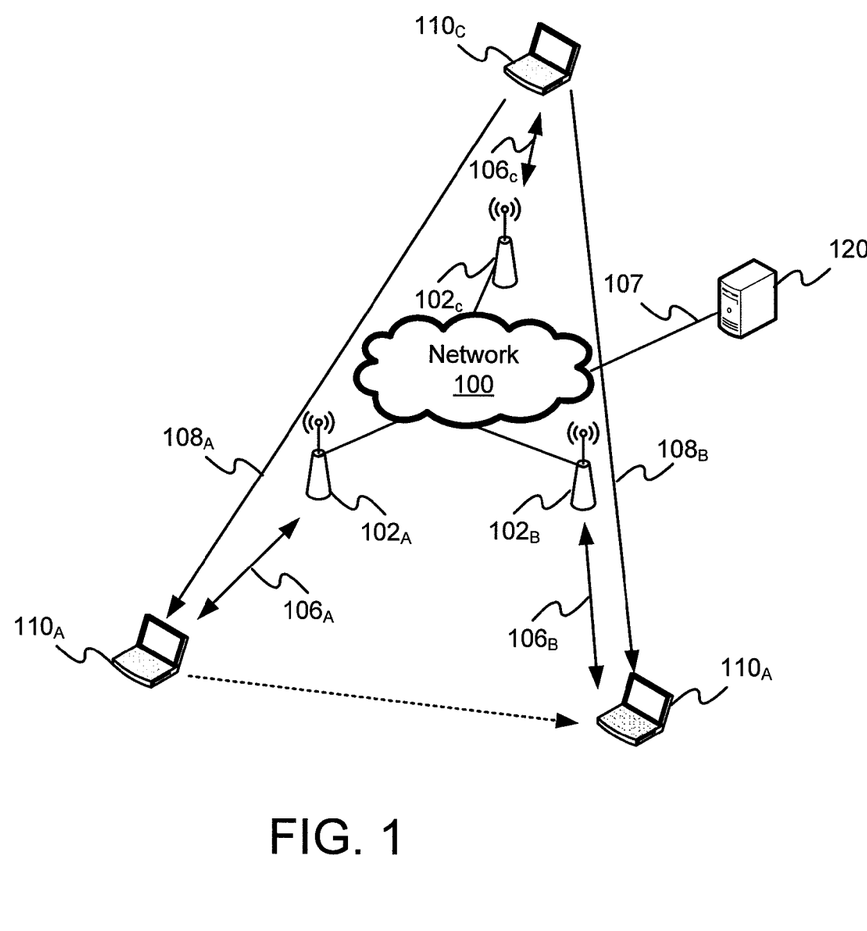
FIG. 1 shows an embodiment of a wireless networking that supports roaming of wireless computing devices between access points.

Referring now to FIG. 1, a network 100 is shown that operably couples wireless computing devices 110 and wired computing devices 120. The network 100 may include multiple wireless access points 102. The wireless access points 102 generally create wireless connections 106 to the wireless computing devices 110 and provide such connected wireless computing devices 110 with access to file servers, application servers, other computing devices 110, 120, and/or other network resources having a wireless connection 106 or wired connection 107 to the network 100. In one embodiment, the wireless access points 102 create wireless access network connections 106 in accordance with a Wi-Fi standard such as IEEE 802.11a, 802.11b, 802.11g, and/or 802.11n, but other types of wireless connections may also be supported.

The wireless access points 102 and wireless computing devices 110 may implement a roaming protocol such as IEEE 802.11r to support roaming of a wireless computing device 110 between wireless access points 102 of the network 100. For example, as shown in FIG. 1, a wireless computing device $110_A$ may roam from wireless access point $102_A$ to wireless access point $102_B$ thus resulting in the wireless connection $106_A$ to the wireless access point $102_A$ being dropped and a wireless connection $106_B$ to the wireless access point $102_B$ being established.

The wireless access points 102 and wireless computing devices 110 may also implement a security protocol to encrypt and secure the wireless connection 106 established between the wireless computing devices 110 and a wireless access points 102. In one embodiment, the wireless access points 102 and wireless computing device 110 may implement the IEEE 802.11i security protocol in order to establish secure wireless connections 106. However, embodiments may establish secure wireless connections between the wireless access points 102 and wireless computing devices 110 using other security protocols.

The wireless computing devices 110 and/or wired computing devices 120 may also implement a secured session protocol to provide secured sessions 108 between wireless and/or wired computing devices 110, 120. In one embodiment, the wireless and/or wired computing devices 110, 120 may use a Transport Layer Security (TLS) protocol to establish secured sessions 108; however, other secure session protocols may also be used.

Figure 2:
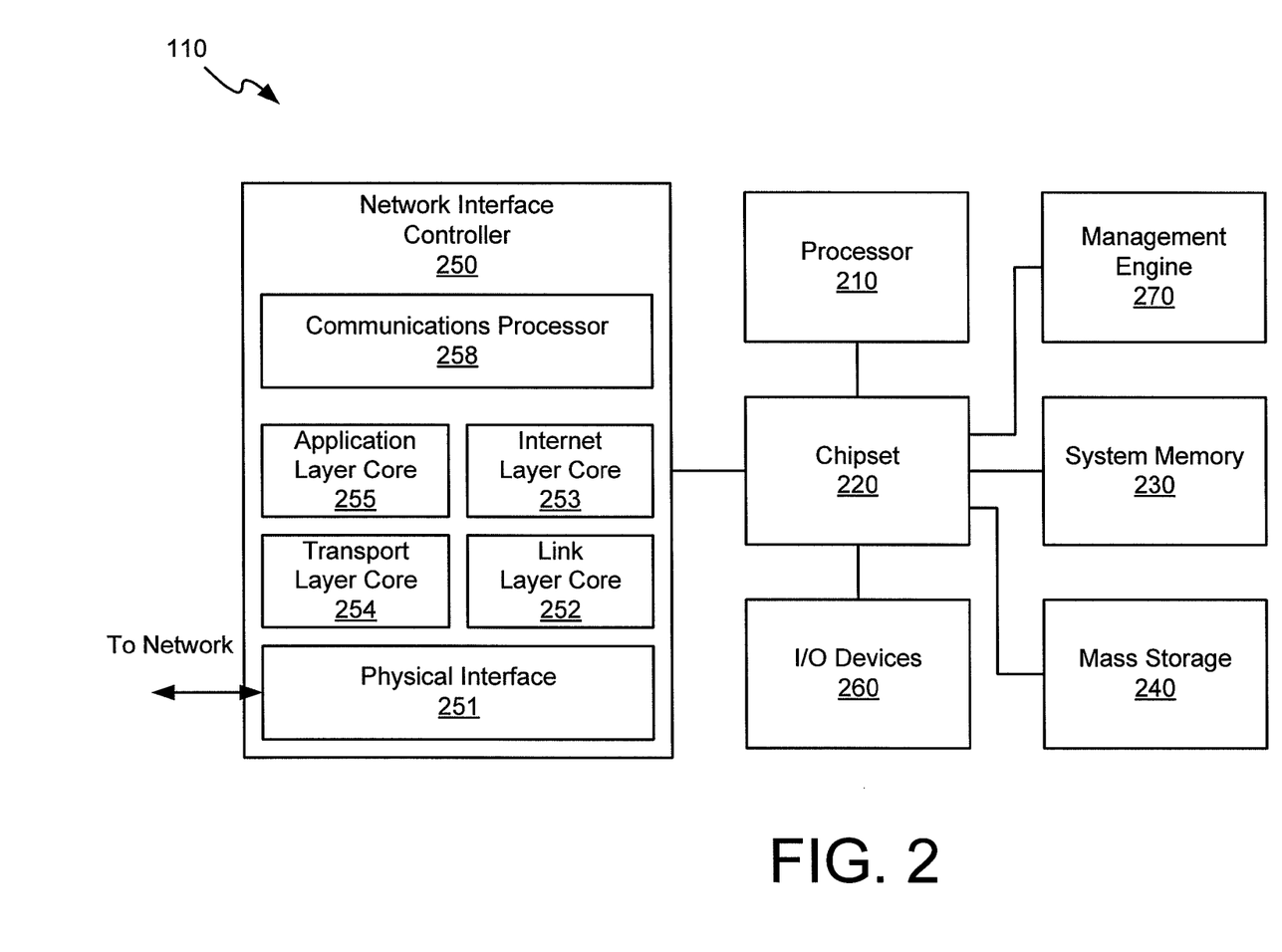
FIG. 2 shows an embodiment of a computing device of FIG. 1.

Referring now to FIG. 2, additional details regarding the computing devices 110 are shown. It should be appreciated that the details of the computing devices 110 shown in FIG. 2 are also generally applicable to the wired computing devices 120 of FIG. 1. As shown in FIG. 2, the computing device 110 may include a processor 210, a chipset 220, and system memory 230. The computing device 100 may further include a mass storage device 240, a wired and/or wireless network interface controller 250, and I/O devices 260. The processor 210 may comprise one or more processors from Intel Corp. or another processor manufacture such as IBM Corp. and AMD Inc. The processor 210 may include one or more processing cores to fetch and execute software and/or firmware instructions that define the operation the computing device 110.

The chipset 220 may include controllers to control components of the computing device 110. For example, the chipset 220 may include platform supporting hardware such as one or more Direct Memory Access (DMA) controllers, an interrupt controller, and a real time clock. The chipset 220 may also include a memory controller to provide an interface between the processor 210 and the system memory 230. In some embodiments, the memory controller or portions of the memory controller may be integrated into the processor 210. The chipset 220 may also include one or more mass storage device interface controllers such as, for example, a Parallel AT Attachment (ATA) interface controller, a Serial ATA interface controller, and/or Small Computer System Interface (SCSI) controller IDE to interface the mass storage device 240. Further, the chipset 220 may include a graphics controller, Universal Serial Bus (USB) controller, Peripheral Component Interconnection (PCI) Express controllers, audio controllers, keyboard controllers and the like in order to controller corresponding I/O devices 260 and other components of the computing device 110.

The system memory 230 and/or mass storage device 240 may store data and instructions to be processed and executed by the processor 210. The mass storage device 240 may include floppy disk drives, hard drive disks, compact disk drives, and digital versatile disk (DVD) drives to store data and/or instructions in a non-volatile manner. The system memory 230 may comprise various types of volatile and/or non-volatile memory devices. For example, system memory 230 may include volatile memory devices such as Synchronous Dynamic Random Access Memory (SDRAM) devices, Dynamic Random Access Memory (DRAM) devices, RAMBUS Dynamic Random Access Memory (RDRAM) devices, and/or other volatile memory devices. Further, the system memory 230 may include non-volatile memory devices such as, for example, flash memory devices, read only memory (ROM) devices, Electrical Erasable Programmable ROM (EEPROM) devices, battery backed RAM devices, and/or other non-volatile memory devices.

The computing device 110 may further include a management engine 270. The management engine 270 provides a hardware level based remote administration of the computing device 110. In particular, the management engine 270 may provide such remote administration without reliance upon an operating system of the computing device 110.

The network interface controller 250 provides an interface between the computing device 100 and a network such as network 100 of FIG. 1. In one embodiment, the network interface controller 250 provides an interface to networks that utilize the Internet Protocol Suite of networking protocols. Moreover, as described in more detail below, the network interface controller 250 is capable of responding to various types of networking protocol packets without involving the processor 210, thus permitting the processor 210 and other components of the computing device 110 to remain in a sleep state or other low power state while still processing such networking protocol packets. To this end, the network interface controller 250 may include a physical interface 251 that includes circuitry to send and receive networking signals to and from the network 100 and may include various networking cores 252, 253, 254, 255 to process packets of various aspects of the networking protocols of the Internet Protocol Suite.

The Internet Protocol Suite includes a set of layered or stacked communications protocols to handle certain aspects of networking communications over the Internet or similar networks. In particular, the Internet Protocol Suite typically includes link layer protocols, Internet layer protocols, transport layer protocols, and application layer protocols. As such, the network interface controller 250 in one embodiment may include a link layer core 252, an Internet layer core 253, a transport layer core 254, an application layer core 255, an communications processor 258 to respectively process link layer protocol packets, Internet layer protocol packets, transport layer protocol packets, application layer protocol packets, security credentials and other networking protocol data without waking the processor 210.

Link layer protocols such as for example, the ARP (Address Resolution Protocol) protocol, RARP (Reverse Address Resolution Protocol) protocol, and the NDP (Neighbor Discovery Protocol) protocol utilize the physical interface 251 to create links between adjacent network nodes of local area network segment. The Internet layer protocols such as IPv4 (Internet Protocol version 4) and IPv6 (Internet Protocol version 6) protocols utilize the link layer protocols to transport packets from an originating host to a destination host that may be part of the same LAN segment or another LAN segment. The transport layer protocols such as TCP (Transport Control Protocol) and UDP (User Datagram Protocol) protocols encapsulate application data into packets and deliver such packets to destination hosts using the Internet layer protocols. Finally, the application layer protocols interface applications of the computing devices 110 to the transport layer protocols in order to provide application services on the network 100. Examples of application layer protocols include HTTP (Hypertext Transport Protocol) protocol, TLS (Transport Layer Security) protocol, and SMTP (Simple Mail Transport Protocol) protocol to name a few.

Each networking core 252, 253, 254 and 255 in one embodiment may comprise digital and/or analog circuitry dedicated to handling certain aspects of a corresponding networking protocol. In another embodiment, the networking cores 252, 253, 254 and 255 may be implemented by a communications or other type of processor 258 and associated firmware of the network interface controller 250. While the depicted embodiment shows the networking cores 252, 253, 254, and 255 as part of the network interface controller 250, the networking cores 252, 253, 254 and 255 in other embodiments may be distributed amongst various processing resources or cores of the computing device 110. For example, the networking cores 252, 253, 254, and 255 may be implemented using processing cores of the processor 210, processing cores of the management engine 270, processing cores of the chipset 220, processing cores of a communications processor 258, as well as virtual processing cores provided by virtualization software executed by the management engine 270 and/or processor 210.

In some embodiments, the computing device 110 may include low power co-processors such as the management engine 270 and/or low power cores of the processors 210 to execute virtualization software. Such low power processing resources as result of executing the virtualization software may create one or more low power virtual machines. Such low power virtual machines may provide network processing resources that implement one or more of the networking cores 252, 253, 254 and 255.

In embodiments in which one or more of the networking processors 252, 253, 254, and/or 255 are implemented using processing cores of the processor 210, the computing device 110 may power only a subset of the processing cores of the processor 210 used to implement the networking cores 252, 253, 254 and/or 255 while maintaining the remaining processing cores in a low power or a sleep state. Regardless of how the networking cores 252, 253, 254 and 255 are distributed among the processing resources of the computing device 110, the computing device 110 in one embodiment powers the networking cores 252, 253, 254 and 255 or a subset of the networking cores 252, 253, 254 and 255 while the computing device 110 sleeps to permit processing aspects of associated networking protocols without waking the computing device 110.

Figure 3:
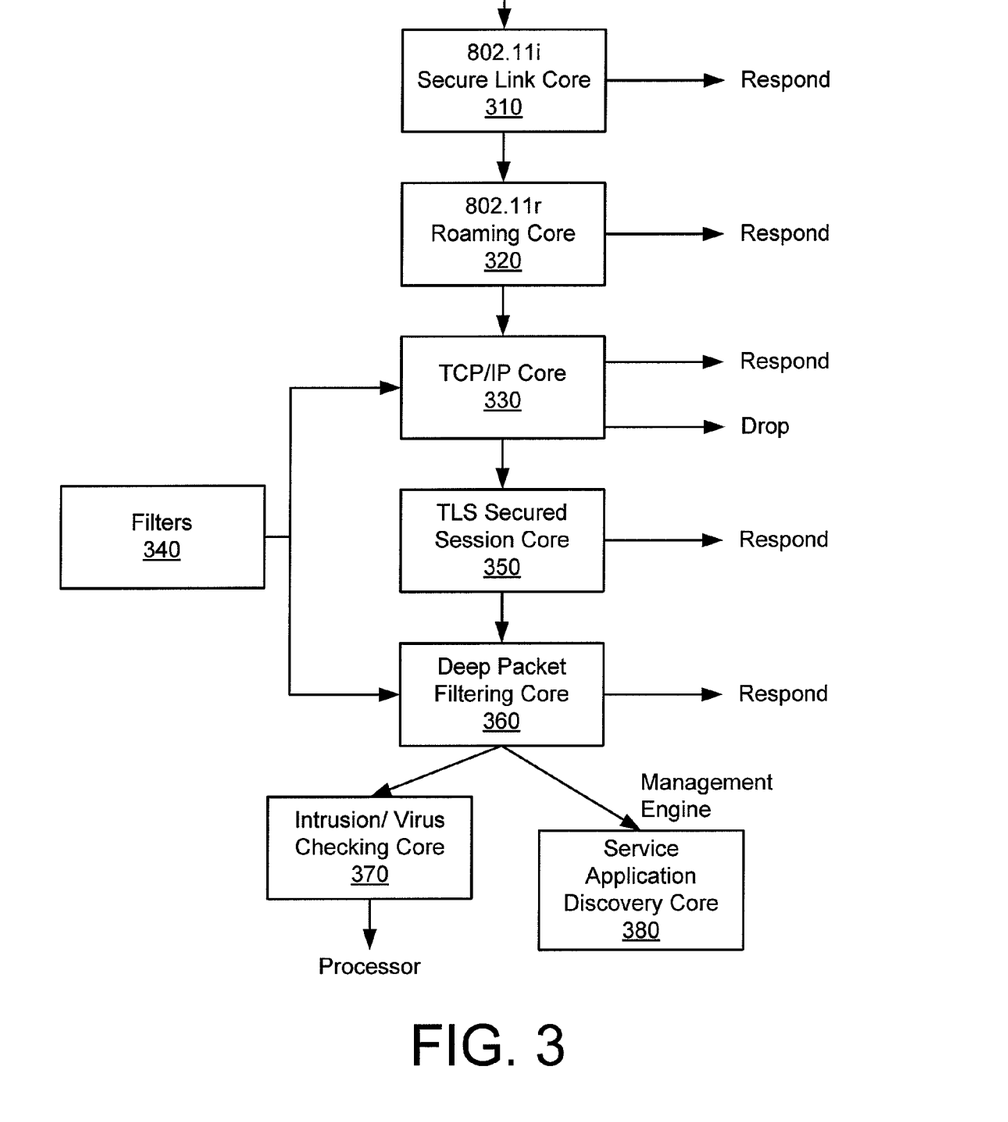
FIG. 3 show networking cores of an embodiment of a computing device.

Referring now to FIG. 3 additional details regarding processing of network packets by an embodiment of the computing device 110 are shown. As shown, a received packet may pass through an 802.11i secure link core 310, an 802.11r roaming core 320, a TCP/IP core 330, a TLS secured session core 350, a deep packet filtering core 360, and an intrusion/virus checking core 370 or a service application discovery core 380. In one embodiment, the link layer core 252 of the network interface controller 250 may implement the 802.11i secure link core 310 and the 802.11r roaming core 320. Further, the Internet layer core 253 and the TCP layer core 254 may implement the TCP/IP layer core 330 and the application layer core 255 may implement the TLS secured session core 350. Moreover, a communication processor 250 may implement the intrusion/virus checking core 370, and the management engine 270 may implement the service application discovery core 380.

The IEEE 802.11i secure link core 310 may generally establish a secured wireless connection or link 106 to a wireless access point 102 without waking the processor 210. Furthermore, the secure link core 310 may further re-establish a secured wireless connection 106 with a wireless access point 102 in response to detecting the wireless connection 106 has been dropped or otherwise disconnected without waking the processor 210. In particular, the secure link core 310 may implement a four-way handshake used by the IEEE 802.11i protocol to establish a secured wireless connection with the access point in response to detecting the wireless connection has been disconnected.

In one embodiment, the computing device 110 may power the secure link core 310 while one or more cores of the processor 210 are placed in a sleep state or other low power inactive state. Thus, the secure link core 310 may permit the computing device 110 to establish, re-establish and otherwise maintain a secured network connection 106 to a wireless access point 102 while the computing device 110 remains in a sleep state. Conventional computing devices 110 wake the processor 210 in order to establish or re-establish an IEEE 802.11i secured wireless connection 106. Moreover, re-establishing a wireless connection after detecting the loss of a secured wireless connection 106 is a common event for many types of computing devices. Accordingly, the secure link core 310 may permit the computing device 110 to remain in the sleep state for a longer period of time than conventional computing devices as such conventional computing devices are frequently woken in order to re-establish an 802.11i wireless connection 106.

The link layer core 252 may also include an IEEE 802.11r roaming core 320. The IEEE 802.11r protocol permits continuous connectivity of computing devices 110 in motion with fast and secure handoffs from one wireless access point 102 to another wireless access point 102. For example, a shown in FIG. 1, a computing device $110_A$ may be physically moved from a first location within range of a first wireless access point $102_A$ to a second location within range of a second wireless access point $102_B$. In response to the computing device $110_A$ moving from the first location to the second location, the roaming core 320 may decide to drop the wireless connection $106_A$ to the first wireless access point $102_A$ and establish the wireless connection $106_B$ to the second wireless access point $102_B$. More specifically, the roaming core 320 in one embodiment may drop the connection $106_A$ and establishes the connection $106_B$ per the IEEE 802.11r protocol.

In one embodiment, the computing device 110 may power the roaming core 320 while one or more cores of the processor 210 is placed in sleep state or other low power inactive state. Thus, the roaming core 320 may permit the computing device 110 to maintain continuous wireless connectivity to the network 100 as the computing device 110 is moved from one location to another within the range of the wireless access points 102 while the computing device 110 remains in a sleep state. Conventional computing devices implement the 802.11r protocol under the direction of software executed by the processor 210. As such, conventional computing devices permit the computing device 110 to roam among the wireless access points 102 and to maintain continuous wireless connectivity to the network 100 only while the processor 210 is awake. The roaming core 320, however, in one embodiment is powered even when the computing device 110 is in a sleep state. As such, the roaming core 320 may permit the computing device 110 to roam between wireless access points 102 and to maintain continuous wireless connectivity to the network 100 while computing device 110 remains in a sleep state.

As noted above, the network interface controller 250 may include an Internet layer core 253 and a transport layer core 254. In one embodiment, the Internet layer core 253 and transport layer core 254 are implemented with a TCP/IP (Transport Control Protocol/Internet Protocol) core 330. In one embodiment, the TCP/IP core 330 comprises circuitry to establish TCP/IP connections. The TCP/IP core 330 may also comprise circuitry to process other Internet layer and/or transport layer packets such as UDP/IP (User Datagram Protocol/Internet Protocol) packets, ICMP (Internet Control Message Protocol) packets, DCCP (Datagram Congestion Control Protocol) packets, SCTP (Stream Control Transmission Protocol) packets, as well as others.

In regard to TCP/IP connections, the TCP/IP core 330 may perform a TCP three-way handshake to establish a TCP connection over an IP network. Under the TCP protocol, before a client attempts to connect with a server, the server first binds to a port to open the port up for connections which is called a passive open. Once the passive open is established, a client may initiate an active open which results in a TCP three-way handshake. The three-way handshake includes (i) the client sending a synchronization packet (SYN) to the server, (ii) in response to the SYN, the server replies with an acknowledgement and synchronization packet (SYN-ACK), and (iii) in response to the SYN-ACK, the client sends an acknowledgement packet (ACK) back to the server.

The TCP/IP core 330 may further filter incoming networking packets from the processor 210 in order to keep the processor 210 and the computing device 110 in a sleep state. While in a sleep state, the computing device 110 may receive several networking packets to which a response is not required given that the computing device 110 is in a sleep state. Accordingly, the TCP/IP core 330 may simply drop such incoming packets. Other incoming network packets may be selectively processed by the processor 210 and/or other entities of the computing device 110 such as, for example, the communications processor 258, the management engine 270, networking cores 252, 253, 254, 255, etc. To this end, the network interface controller 250 may include one or more filters 340 that define rules for processing incoming packets. In general, the filters 340 define a plurality of rules that specify criteria for identifying incoming packets of interest and that specify how such packets of interest are to be processed by the computing device 110. In one embodiment, the user or administrator of the computing device 110 may configure the filters 340 in the network interface controller 250. In particular, the user may specify packets of interest by Link Layer Protocol frames (e.g. Group Key Updates, Disassociations, etc.) IP address, TCP or UDP port number, HTTP Tags, application packet contents, TLS security matches, etc. The user may further specify whether a given rule of the filters 340 is to wake up one or more entities of the computing device 110 such as the processor 210, management engine 270, etc.

For example, the TCP/IP core 330 may inspect the TCP and IP headers of incoming packets for IP addresses and/or ports specified by the filters 340. If the IP addresses and/or ports match a rule of the filter 340, then the TCP/IP core 330 may take an action specified by the matched rule. For example, a rule of the filter 340 may indicate that a matched packet may simply be dropped or may identify an entity to process the matched packet such as, the processor 210, the communications processor 258, the management engine 270, a networking core 252, 253, 254, 255, etc. If the identified entity is in a sleep state, then the TCP/IP core 330 may awaken the entity that is to process the incoming packet.

As noted above, the network interface controller 250 may include an application layer core 255. As shown in FIG. 3, the application layer core 255 may include a Transport Layer Security (TLS) secured session core 330 to establish and maintain TLS secured sessions between computing devices 110, 120. In one embodiment, the TLS secured session core 330 may establish, re-establish and maintain TLS secured sessions while the computing device 110, 120 is in a sleep state. The TLS secured session core 330 may execute TLS sub-protocols such as, for example, a simple TLS handshake, a client-authorization TLS handshake, and a resumed TLS handshake as specified in RFC (Request For Comment) 5246. As a result of such network interface controller implemented handshaking, the TLS secured session core 330 may authenticate the computing device 110, negotiate keys based upon a pre-master-secret or public key of the computing device 110, and decrypt application packets such as HTTPS (Hypertext Transport Protocol Secured) packets based upon the negotiated keys. In this manner, TLS secured session core 330 of the network interface controller 250 may obtain plaintext HTTP (Hyptext Transport Protocol) requests or other types of application layer requests and provide such plaintext requests to the deep packet filtering core 360.

In one embodiment, The deep packet filtering core 360 may receive decrypted packets from the TLS secured session core 350 and may inspect the contents of the decrypted packets based upon rules of the filters 340. Like the filters specified for the TCP/IP core 330, a user or administrator of the computing device 110 may specify characteristics of incoming packets and specify actions to be taken in response to determining that the contents of a decrypted packet match a filter 340. For example, depending upon the matched rule, the deep packet filtering core 360 may respond to a packet, drop a packet, or forward the packet onto another entity for processing.

The intrusion/virus protection core 370 may be implemented by the communications core 258. The intrusion/virus protection core 370 may operate as a network proxy via which all incoming packets are routed before being processed by the processor 210. The intrusion/virus protection core 370 may inspect the incoming packets and attempt to detect packets indicative of intrusions and/or packets containing viruses and prevent such packets from being delivered to the processor 210 for processing; thus, further reducing the packets processed by the processor 210 and increasing the opportunities for the processor 210 to remain in a sleep state.

The service application discovery core 380 may be implemented by the management engine 270. The service application discovery core 380 may respond to service discovery messages such as Universal Plug and Play (UPnP) messages. Generally, the management engine 270 consumes considerably less power than the processor 210 when fully powered. Accordingly, by implementing the service application discovery core 380 with the management engine 270, the processor 210 need not be woken in order for the computing device 110 to respond to these basic discovery messages and the computing device 110 may consume less power.

Figure 4:
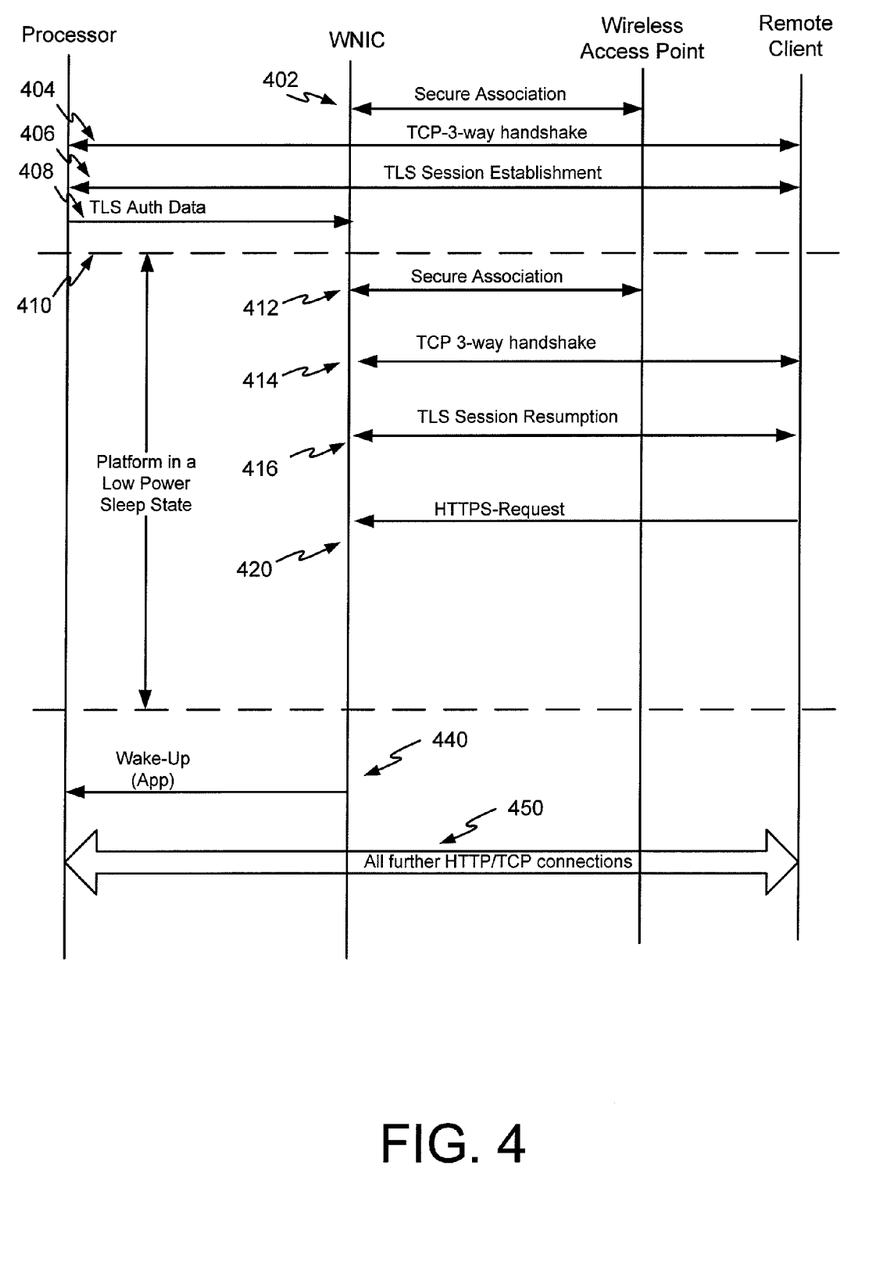
FIG. 4 shows a simplified signal diagram depicting network packets exchanged between a remote client and the computing device FIG. 1.

Referring now to FIG. 4, a simplified signal diagram is shown that depicts network packets exchanged between a remote client and the computing device 110. At 402, the 8021.11i secure link core 310 and the wireless access point 102 establish a secure wireless connection. At 404, the processor 210 and remote client may establish a TCP connection via a three-way handshake. At 406, the processor 210 establishes a TLS secured session with the remote client and at 408 provides the TLS secured session core 350 with TLS authentication data such as negotiated keys so that the TLS secured session core 350 may maintain the TLS secured connection without the aid of the processor 210. At 410, the computing device 110 and processor 210 may be placed into a low power sleep state.

At 412, the 802.11i secure link core 310 may maintain, establish, and/or re-establish the secured connection with the wireless access point 102 while the processor 210 and computing device 110 are in a sleep state. At 414, the TCP/IP core 330 and remote client may establish a TCP connection via a three-way handshake. At 416, the TLS secured session core 350 may resume the TLS secured connection with the remote client using the TLS authentication data previously provided by the processor 210. At 420, the network interface controller 250 may receive a HTTPS request from the remote client and the networking cores 310, 320, 330, 350, 360, 370, 380 may inspect the HTPPS request to determine how the request is to be processed. In particular, the TCP/IP core 330 may filter the HTTPS request based upon header information of the HTTPS request and the filters 340. After decrypting the contents of the HTTPS request, the deep packet filter core 360 may inspect the content of the HTTPS request and filter the HTTPS request based upon the content of the request and the filters 340. Assuming the request passes the various filters and checks of the networking cores 310, 320, 330, 350, 360, 370, and 380, the network interface controller 250 may wake the processor 210 at 440. The processor 210 at 450 may respond to the HTTPS request and future HTTPS requests via the network interface controller 250.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:

1. A computing device for operating in a sleep state, the computing device comprising:
   a main processor;
   a first low-power co-processor;
   a second low-power co-processor; and
   a network interface controller to (i) receive one or more network packets while the computing device is in a sleep state, (ii) filter the one or more network packets to identify network packets to be handled by the first low-power co-processor without waking the main processor from the sleep state, and (iii) wake the first low-power co-processor, without waking the main processor, to handle at least one network packet of the identified network packets to be handled by the first low-power co-processor,
   wherein the first low-power co-processor is to filter the filtered one or more network packets to identify network packets to be handled by the second low-power co-processor of the computing device without waking the main processor from the sleep state.

2. The computing device of claim 1, wherein the first low-power co-processor comprises a manageability engine to provide remote administration of the computing device.

3. The computing device of claim 1, wherein each of the main processor and the first low-power co-processor is to operate in a low-power state when in the sleep state.

4. The computing device of claim 1, wherein:
   the network interface controller is to (i) filter the one or more network packets to identify network packets to be handled by the second low-power co-processor without waking the main processor from the sleep state and (ii) wake the second low-power co-processor, without waking the main processor or the first low-power co-processor, to handle at least one network packet of the network packets identified to be handled by the second low-power co-processor.

5. The computing device of claim 1, wherein the first low-power co-processor is to process at least one of a link layer protocol packet, an Internet layer protocol packet, a transport layer protocol packet, or an application layer protocol packet.

6. One or more non-transitory machine-readable storage media comprising a plurality of instructions stored thereon that, in response to execution, cause a computing device operating in a sleep state to:
   receive, by a network interface controller, one or more network packets while the computing device is in the sleep state;
   filter, by the network interface controller, the one or more network packets to identify network packets to be handled by a first processing core of the computing device without waking a main processor of the computing device from the sleep state;
   wake, by the network interface controller, the first processing core, without waking the main processor, to handle at least one network packet of the identified network packets; and
   filter, by the first processing core, the filtered one or more network packets to identify network packets to be handled by a second processing core of the computing device without waking the main processor from the sleep state.

7. The one or more non-transitory machine-readable storage media of claim 6, wherein the network interface controller includes the first processing core.

8. The one or more non-transitory machine-readable storage media of claim 7, wherein the plurality of instructions further cause the computing device to handle, by a second processing core of the computing device, the one or more received network packets while the main processor and the first processing core are in the sleep state.

9. The one or more non-transitory machine-readable storage media of claim 6, wherein to wake the main processor comprises to wake one or more processing cores of the main processor from the sleep state.

10. The one or more non-transitory machine-readable storage media of claim 6, wherein the first processing core is a processing core of a low-power co-processor of the computing device.

11. The one or more non-transitory machine-readable storage media of claim 6, wherein the plurality of instructions further cause the computing device to:
   filter the one or more network packets to identify network packets to be handled by a second processing core of the computing device without waking the main processor from the sleep state; and
   wake the second processing core, without waking the main processor or the first processing core, to handle at least one network packet of the network packets identified to be handled by the second processing core.

12. The one or more non-transitory machine-readable storage media of claim 6, wherein each of the main processor and the first processing core are to operate in a low-power state when in the sleep state.

13. The one or more non-transitory machine-readable storage media of claim 6, wherein the computing device comprises a low-power virtual machine to implement the first processing core.

14. The one or more non-transitory machine-readable storage media of claim 6, wherein the first processor core is a low-power core of the main processor; and wherein to wake the main processor comprises to wake a processing core of the main processor other than the low-power core.

15. A method for operating a computing device in a sleep state, the method comprising:

receiving, by a network interface controller of the computing device, one or more network packets while the computing device is in a sleep state;

filtering, by the network interface controller and without waking a main processor of the computing device from the sleep state, the one or more network packets to identify network packets to be responded to by a first low-power co-processor of the computing device;

waking, by the network interface controller and without waking the main processor, the first low-power co-processor to respond to at least one network packet of the identified network packets; and filtering, by the first low-power co-processor, the filtered one or more network packets to identify network packets to be responded to by a second low-power co-processor of the computing device without waking the main processor from the sleep state.

16. The method of claim 15, further comprising:

filtering, by the network interface controller, the one or more network packets to identify network packets to be handled by the second low-power co-processor without waking the main processor from the sleep state; and waking the second low-power co-processor, without waking the main processor or the first low-power co-processor from the sleep state, to handle at least one network packet of the network packets identified to be handled by the second low-power co-processor.

17. The method of claim 15, wherein filtering the one or more network packets to identify network packets to be responded to by the first low-power co-processor comprises determining whether each of the one or more network packets is one of a link layer protocol packet, an Internet layer protocol packet, a transport layer protocol packet, or an application layer protocol packet.

18. The method of claim 15, wherein receiving the one or more network packets comprises receiving one or more network packets while the computing device is in a low-power state.

19. A computing device for operating in a sleep state, the computing device comprising:

a main processor;

a first low-power co-processor;

a second low-power co-processor; and a network interface controller to (i) receive one or more network packets while the computing device is in a sleep state, (ii) filter the one or more network packets to identify network packets to be handled by the first low-power co-processor without waking the main processor from the sleep state and to identify network packets to be handled by the second low-power co-processor without waking the main processor from the sleep state, (iii) wake the first low-power co-processor, without waking the main processor or the second low-power co-processor, to handle at least one network packet of the identified network packets to be handled by the first low-power co-processor, and (iv) wake the second low-power co-processor, without waking the main processor or the first low-power co-processor, to handle at least one network packet of the network packets identified to be handled by the second low-power co-processor.

* * * * *